US 7,200,118 B2

(12) United States Patent
Bender et al.

(10) Patent No.: US 7,200,118 B2
(45) Date of Patent: Apr. 3, 2007

(54) IDENTIFYING FAULTY NETWORK COMPONENTS DURING A NETWORK EXPLORATION

(75) Inventors: Carl A Bender, Highland, NY (US); Nicholas P Rash, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 09/907,422

(22) Filed: Jul. 17, 2001

(65) Prior Publication Data

US 2003/0016629 A1    Jan. 23, 2003

(51) Int. Cl.
H04J 1/16    (2006.01)
(52) U.S. Cl. ............ 370/242; 370/245; 370/255; 370/471
(58) Field of Classification Search ............ 370/254, 370/255, 355, 356, 453, 241, 242, 471, 457, 370/465, 245, 229; 710/10, 9
See application file for complete search history.

(56) References Cited

U.S. PATENT DOCUMENTS

| | | | |
|---|---|---|---|
| 5,210,742 A * | 5/1993 | Barri et al. ............ | 370/400 |
| 5,276,440 A | 1/1994 | Jolissaint et al. ...... | 340/825.02 |
| 5,371,897 A | 12/1994 | Brown et al. ............ | 395/800 |
| 5,563,875 A | 10/1996 | Hefel et al. ............ | 370/15 |
| 5,668,800 A | 9/1997 | Stevenson ............ | 370/248 |
| 5,682,479 A * | 10/1997 | Newhall et al. ............ | 709/242 |
| 5,787,074 A | 7/1998 | Brownmiller et al. ...... | 370/224 |
| 5,832,196 A | 11/1998 | Croslin et al. ......... | 395/182.02 |
| 5,991,264 A | 11/1999 | Croslin ............ | 370/225 |
| 6,199,172 B1 * | 3/2001 | Dube et al. ............ | 714/4 |

FOREIGN PATENT DOCUMENTS

| | | |
|---|---|---|
| JP | 06-037782 | 2/1994 |
| JP | 11-004223 | 1/1999 |
| WO | WO 97/29570 | 8/1997 |
| WO | WO 98/33351 | 7/1998 |

OTHER PUBLICATIONS

IBM Technical Disclosure Bulletin, "Overflow/Fault Recovery Using Automatic Network Routing", vol. 33, No. 4, Sep. 1990, pp. 21-28.
IBM Technical Disclosure Bulletin, "Correlation of Failure Notifications", vol. 37, No. 01, Jan. 1994, pp. 659-670.
IBM Technical Diclosure Bulletin, "Router Automatic Link Re-Establishment Process", vol. 36, No. 07, Jul. 1993, pp. 113-116.

* cited by examiner

*Primary Examiner*—Chi Pham
*Assistant Examiner*—Alexander O. Boakye
(74) *Attorney, Agent, or Firm*—John E. Campbell; Kevin P. Radigan, Esq.; Heslin Rothenberg Farley & Mesiti, P.C.

(57) ABSTRACT

A network exploration is performed to initialize one or more network elements of the network. If during the network exploration a failure is encountered, a systematic and deterministic approach is used to accurately and particularly identify the faulty network component that caused the failure.

8 Claims, 4 Drawing Sheets

IDENTIFYING FAULTY NETWORK COMPONENTS DURING A NETWORK EXPLORATION

TECHNICAL FIELD

This invention relates, in general, to network explorations, and in particular, to deterministically and accurately identifying, during a network exploration, one or more faulty network components.

BACKGROUND OF THE INVENTION

Distributed communications environments typically include a plurality of nodes connected via an interconnection network. In order to establish communication between the nodes, the network is explored and the various elements of the network are initialized.

In one example, a node of the network is selected to be responsible for conducting the exploration and initialization. That node, referred to herein as the explorer node, typically, attempts to establish communication with the network elements by sending, for instance, initialization or request-status packets. If there is no response from an element, then the explorer must decide whether the next course of action is to retry or to give up and consider that the element or the path to that element is defective.

Often, the exploration process is conducted on a live system (i.e., the system being re-initialized), which tends to complicate the process by introducing other variables, such as network congestion. Thus, the cause of the delayed or missing response is generally unknown. That is, it is not known whether the packet has been lost, misrouted or delayed by other network traffic; or whether there is a defect in the path between the explorer and the target element (i.e., the element to be initialized); or if the target element is itself defective.

Previously, a retry protocol has been used, which waits a predefined amount of time and then resends the packet a set number of times (each time waiting the predefined amount of time for a response) before giving up. This technique is, however, error prone for a number of reasons. First, if the network is simply congested, then the explorer will eventually get several responses which it must handle. These responses may not return until well after the explorer has moved on; at which point, the explorer must be able to distinguish these responses as duplicates of a prior exploration and discard them. Second, the fault may not lie in the target element, but instead, be somewhere between the explorer and the target element. This technique cannot distinguish between the two. Third, the target may have discarded the packet because it was busy, and the retry could also be discarded, if it arrives at the target immediately after the original.

Thus, a need still exists for an exploration capability which overcomes the deficiencies of the previous retry protocol. In particular, a need exists for a technique that accurately identifies one or more faulty network components that resulted in one or more failures being encountered during the exploration of a network.

SUMMARY OF THE INVENTION

The shortcomings of the prior art are overcome and additional advantages are provided through the provision of a method of exploring at least a portion of the network. The method includes, for instance, sending a message to a selected network element of a network to explore the selected network element, the sending using a communications path of the network usable for other communications of the network; and determining, in response to the selected network element being unresponsive to the message, a faulty network component of the network.

In a further embodiment, a method of exploring a network is provided. The method includes, for instance, exploring one or more network elements of a network, the network including one or more communications paths, and wherein the exploring uses at least one communications path of the one or more communications paths to explore the one or more network elements; and identifying, in response to a failure encountered during the exploring, a faulty network component.

In yet a further embodiment of an aspect of the invention, a method of exploring a network is provided. The method includes, for instance, sending a message to a child network element to explore the child network element; sending a message to a parent network element of the child network element, when the child network element is considered unresponsive; determining that a link between the parent network element and the child network element is faulty, when the parent network element is responsive and the child network element is considered unresponsive; selecting a parent of the parent network element and sending a message to the parent, when the parent network element is considered unresponsive; repeating the selecting one or more times, when the selected parent is considered unresponsive, wherein with each iteration the selected parent becomes the parent network element and the newly selected parent is the parent of the parent network element; and indicating that a link between the parent network element and its parent is faulty, when the parent is responsive and its parent network element is considered unresponsive.

System and computer program products corresponding to the above-summarized methods are also described and claimed herein.

Advantageously, a network exploration capability is provided, which accurately and particularly identifies faulty network components that result in one or more failures being encountered during the exploration of the network.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a network exploration is performed to initialize one or more elements of a network. During the network exploration, if a failure is encountered, a cause of that failure is accurately identified. In particular, in one example, if a failure is encountered during the exploration, then a determination is made as to the faulty component, which resulted in the failure. As examples, the faulty component may be a connection or link between two network elements and/or a network element itself.

Figure 1:
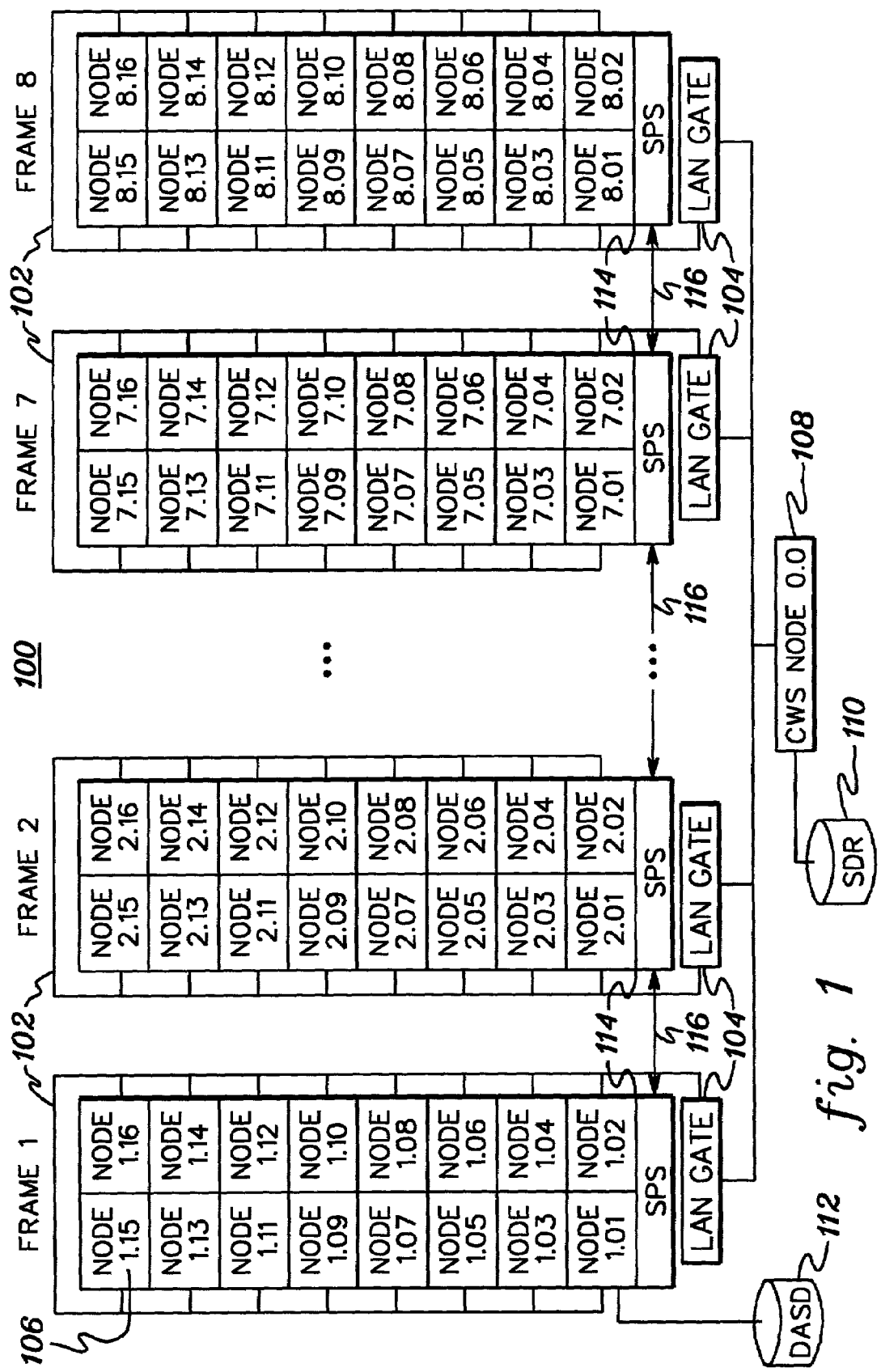
FIG. 1 depicts one embodiment of a communications environment incorporating and using one or more aspects of the present invention.

One embodiment of a communications environment incorporating and using aspects of the present invention is depicted in FIG. 1. As one example, the communications environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a RISC/6000 computer running AIX, a Unix based operating system. Each processing node within a frame is coupled to the other processing nodes of the frame via, for example, at least one internal LAN connection. Additionally, each frame is coupled to the other frames via LAN gates 104.

As examples, each LAN gate 104 includes either a RISC/6000 computer, any computer network connection to the LAN or a network router. However, these are only examples. It will be apparent to those skilled in the relevant art that there are other types of LAN gates and that other mechanisms can also be used to couple a frame to one another.

In one embodiment, coupled to LAN gates 104 is a control workstation (CWS) 108, which controls operation of computing environment 100. The control workstation has coupled thereto at least one storage medium 110, such as a direct access storage device (DASD). The storage medium is referred to, in one example, as the System Shared Disk, which is used to store one or more System Data Repository (SDR) files. The SDR files include such information as a list of nodes that are in the environment and their configuration, as well as one or more resources and object definitions for each of nodes 106. One or more of nodes 106 also includes a DASD device 112 for storing data processed by computing environment 100.

In one embodiment, the nodes in each frame are coupled to an IBM Scalable POWERparallel switch (SPS) 114 located within the frame. Each SPS switch is coupled to one or more neighboring SPS switches 114 of other frames by a bus 116. The switches are used, for instance, to send messages and data from one to another of the nodes 106.

The distributed computing environment of FIG. 1 is only one example. It is possible to have more or less than eight frames or more or less than sixteen nodes per frame. Further, the processing nodes do not have to be RISC/6000 computers running AIX. Some or all of the processing nodes can include different types of computers and/or different operating systems. Further, in another embodiment, one or more of the frames do not include an SPS switch. In that case, each node of a frame without a switch is coupled to a switch of another frame (or one or more nodes are not connected to any switch). Additionally, aspects of the invention are useful with other types of communications environments. All of these variations and more are considered a part of the claimed invention.

Figure 2:
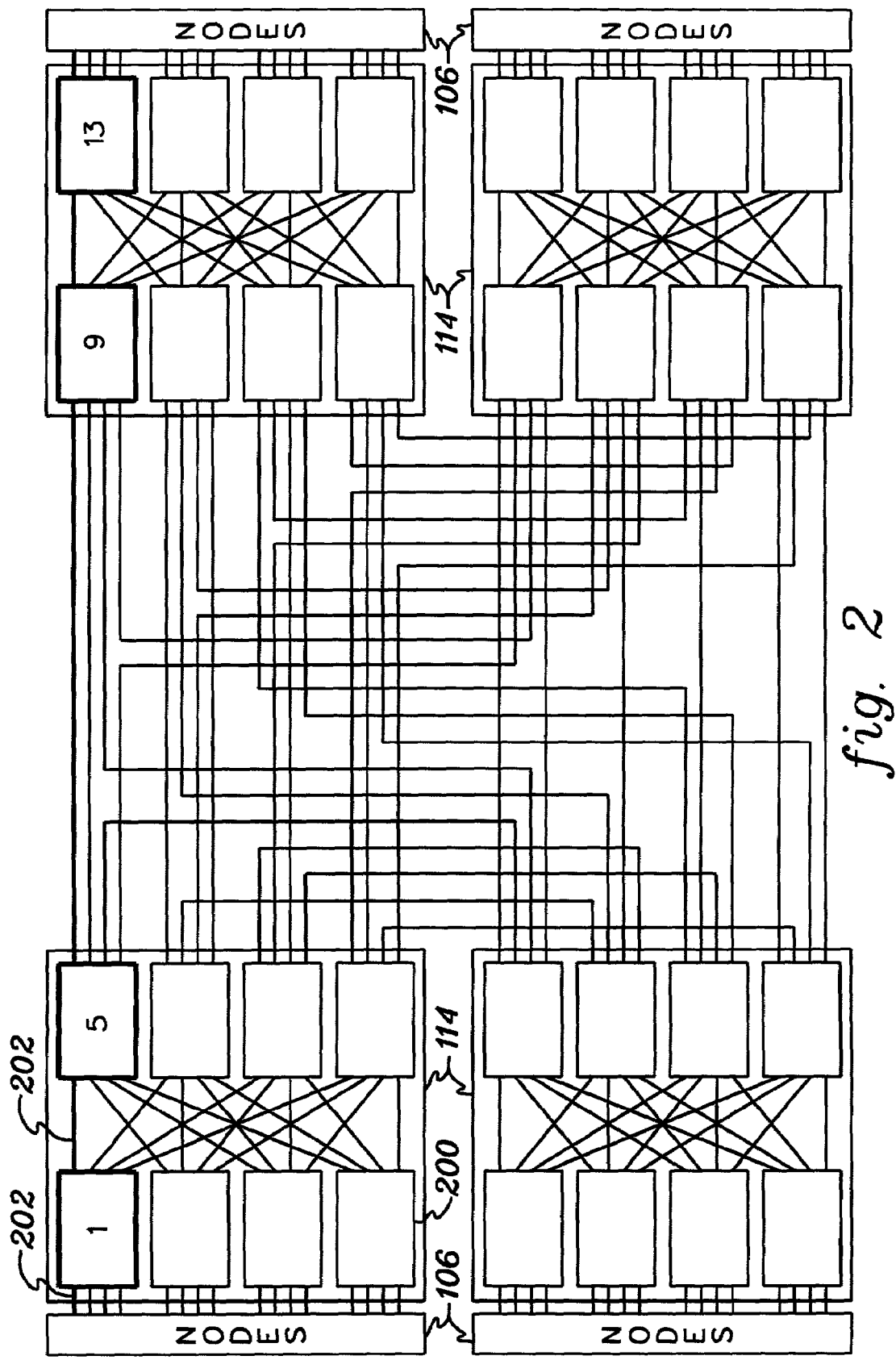
FIG. 2 depicts one embodiment of a plurality of network elements coupled to a plurality of the nodes of FIG. 1, in accordance with an aspect of the present invention.

Further details regarding SPS switches 114 are described with reference to FIG. 2. Depicted in FIG. 2, as one example, are four SPS switches 114, each of which is coupled to a plurality of nodes 106. In this one example, each SPS switch is coupled to sixteen nodes of a frame. Further, each SPS switch is coupled to one or more other SPS switches. In the example depicted, each switch is coupled to three other switches. However, this is only one example. A switch may be coupled to more or less than three switches (even 0). Further, each switch may be coupled to more or less than sixteen nodes.

Each switch includes one or more switching elements 200, and each switching element includes one or more connections (or links) 202. Each connection is to a node (a.k.a., an endpoint) or another switching element. As one example, each switch has eight switching elements, and each switching element has eight connections therefrom. Again, this is only one example. A switch may have more or less than eight switching elements and more or less than eight connections per element.

In accordance with an aspect of the present invention, a network exploration is performed, which includes exploring and initializing elements of the network, such as the individual switching elements. During the exploration, one or more failures may be encountered. If such a failure is encountered, a determination is made as to which particular network component (e.g., network element, such as a node or switching element, and/or connection) is faulty. This determination is made by using a systematic approach for locating faulty components, in accordance with an aspect of the present invention.

As one example, assume that a network 300 (FIG. 3) includes a plurality of network elements 302 coupled to at least one Explorer Node 304. The Explorer Node is one of the nodes of the computing environment selected to be responsible for the exploration.

In one example, Explorer Node 304 is coupled to a Network Element 1 via a connection or link 306, and that Network Element is coupled to one or more other network elements (e.g., Network Elements 5, 6, 7 and 8) via one or more other connections 306, which in turn are connected to one or more other network elements, and so forth. As one example, each network element between the Explorer Node and an endpoint, which is another node, is a switching element. However, this is only one example. The network elements can be other than switching elements and the endpoint need not be another node.

The Explorer Node initiates an exploration of at least a portion of the network by sending a packet through the network via a defined path. For instance, a path may be from Explorer Node 304 to Network Element 1; from Network Element 1 to Network Element 5; from Network Element 5 to Network Element 9; from Network Element 9 to Network Element 13; and from Network Element 13 to an Endpoint (e.g., a node). (This corresponds to the highlighted path in FIG. 2, and is presented in FIG. 3 as one example.) As each network element receives the packet, it responds to the Explorer. Should an element fail to respond, then the Explorer Node uses an efficient and deterministic technique to accurately determine which network component (i.e., network connection and/or network element) is causing the network element to be unresponsive.

One embodiment of the logic associated with this deterministic exploration capability is described with reference to FIG. 4. The logic of FIG. 4 is executed by, for instance, the Explorer Node.

Figure 4:
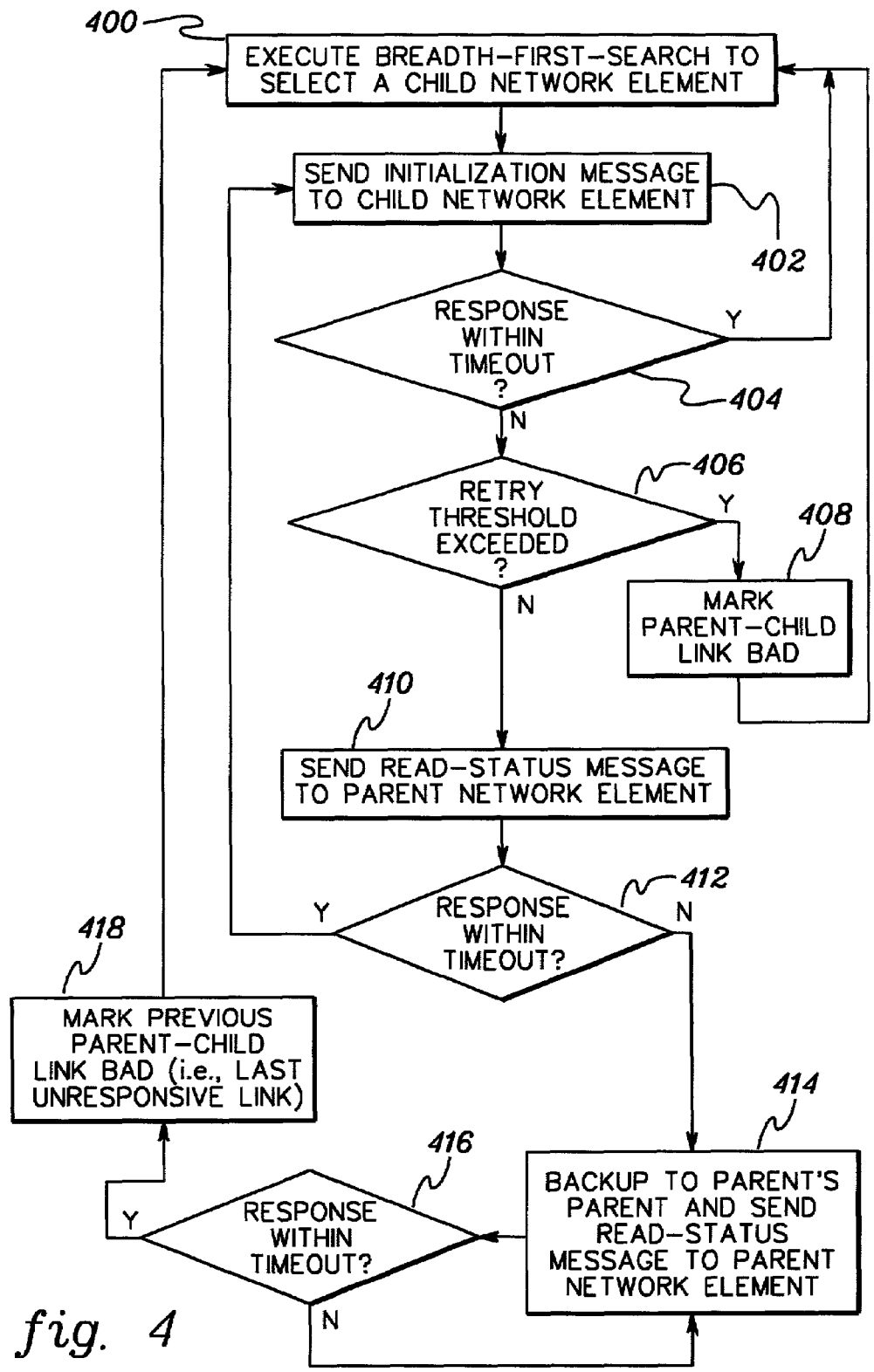
FIG. 4 depicts one embodiment of the logic utilized by an explorer node to explore a network, in accordance with an aspect of the present invention.

In one embodiment, the logic of FIG. 4 assumes that a child network element (i.e., a network element having a parent network element other than the Explorer Node, such as Network Elements 5, 9, 13, etc.) is being initialized. If the network element being initialized is the first element receiving the packet from the Explorer Node (e.g., Network Element 1), then this procedure need not be followed. (Although in another embodiment, it may be utilized.) Instead, a simple retry procedure is used, in which a packet is sent X (e.g., 3) times. If no reply is received within the retry limit, then it is assumed that the faulty network component is the connection between the Explorer Node and Network Element 1 and/or Network Element 1.

Referring to FIG. 4, initially, a breadth-first-search is executed to select a child network element, STEP 400. As is known, a breadth-first-search partitions the network into levels and processes each level at a time. Thus, a search is made of the first element coupled to the explorer (e.g., Network Element 1), and then an exploration is performed of the elements that Network Element 1 is connected to, and so forth.

In this particular example, assume that the breadth-first-search selected Network Element 5 (FIG. 3) as the child element to be initialized. (In this embodiment, assume that Network Element 1 has already been successfully initialized.)

Subsequent to selecting a child network element, an initialization message is sent from the Explorer Node to the selected child network element, STEP 402. The initialization message includes, for instance, information used to configure the child network element. The message takes a particular path from the Explorer Node to the selected child network element (e.g., Explorer Node to Network Element 1 to Network Element 5), which is remembered by the Explorer Node. For instance, an indication of this path is stored by the Explorer Node.

Thereafter, a determination is made as to whether the Explorer Node received a reply from the selected child network element within a predefined time period (e.g., 300 microseconds), INQUIRY 404. If a response was received within the predefined time period, then the selected child network element (i.e., the target element) and the path to that element are functioning appropriately. However, if there was no response within the predefined time period, then a further determination is made as to whether a retry threshold has been exceeded, INQUIRY 406. That is, in one example, the initialization message is sent to the child network element a chosen number of times (e.g., 3 times) before considering that there is a failure in the network.

Should the retry threshold be exceeded, then the parent/child connection is marked as faulty, STEP 408. For example, the Explorer Node, as part of the exploration, maintains a data structure (e.g., a table) of the network topology, and makes an indication in this structure that the link between the parent/child (e.g., the connection between Network Element 1 and Network Element 5) is faulty. It may be that the child element itself is not functioning; however, in this embodiment, the child element itself is not considered faulty, unless a plurality of links to the child have failed. (In another embodiment, this may be different; i.e., the child and/or the link may be considered faulty.) Thus, in the above embodiment, the network component determined to be faulty is at least the network connection between the parent and child. Subsequent to marking the link, processing continues with STEP 400.

Returning to INQUIRY 406, if the retry threshold has not been exceeded, then a read-status message is sent from the Explorer Node to the parent of the selected child network element (e.g., Network Element 1), STEP 410. This message is a request to respond message asking the parent element if it is there.

The Explorer Node then waits for a response, and if a response is received within a predefined time period (e.g., 300 microseconds), INQUIRY 412, then the initialization message is sent to the child network element, once again, STEP 402. However, if the response is not received within the predefined time period, then the Explorer Node backs up to the parent's parent, assuming there is a parent other than the Explorer Node, STEP 414. (If the exploration backed-up to the Explorer Node, then the faulty network component is the connection between the Explorer Node and its immediate child and/or the immediate child.) When the Explorer Node backs up, it sends a read-status message to the parent network element of the parent of the child network element.

Once again, a determination is made as to whether the Explorer Node received a response to this message within a predefined time period, INQUIRY 416. If such a response has not been received, then processing continues with STEP 414, as described above.

However, should a response be received within the timeout period, then the previous parent/child link is marked as faulty, STEP 418, and processing continues with STEP 400 to select the next child network element to be initialized.

Figure 3:
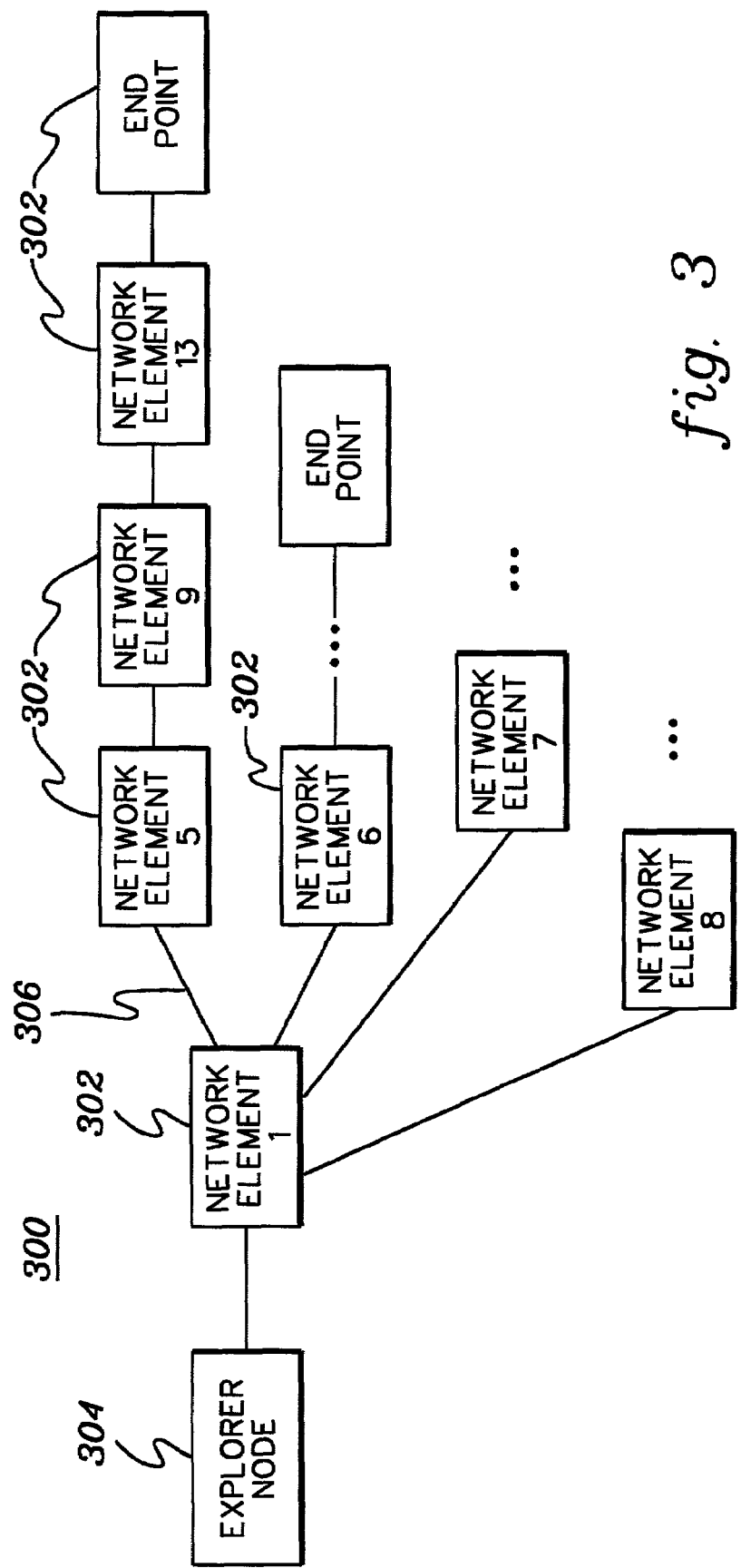
FIG. 3 depicts one embodiment of a pictorial illustration of a plurality of network elements to be explored by an explorer node, in accordance with an aspect of the present invention.

An example of the above is as follows: Assume that the Explorer is attempting to initialize Network Element 9 (FIG. 3). Proceeding through the logic, assume a response has not been received within the timeout period (INQUIRY 404), and the retry threshold has not been exceeded (INQUIRY 406). Also, assume that a response to the read-status message sent to Network Element 5 has not been received within the timeout period. Thus, a read-status message is sent to Network Element 1, which is the parent of Network Element 5. Assume that a response to this message was received. Then, the link between Network Element 1 and Network Element 5 is marked as bad.

Although in this embodiment, the links are marked as faulty, if it is determined that a particular network element cannot be reached by any path, then the particular element is considered faulty.

The network exploration capability described herein advantageously uses the network (i.e., the communication paths of the network) to deterministically and accurately identify a faulty network component. That is, in one embodiment, the exploration capability uses the normal (non-service) communication paths of the network. The exploration capability does not need a special or separate service path to determine the faulty network component.

As used herein, a network component is a network element (e.g., a node, a switching element, etc.) and/or a network connection. In one embodiment, a connection is considered herein as faulty, even if the connection itself is functioning, but an element connected to the connection is bad.

Advantageously, the exploration capability of one or more aspects of the present invention includes a deterministic mechanism to retry network elements to accurately determine where a failure within the network has occurred. In one aspect, the exploration capability provides isolation of failures with the ability to distinguish between congestion, link failures and element failures.

The deterministic capability uses the same path used in an attempt to initialize a targeted element to determine the faulty component. Thus, the retry packet (e.g., messages) cannot overtake the original message due to congestion or other network delays.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of exploring a network, said method comprising:
   exploring one or more network elements of a network, said network comprising one or more communications paths, and wherein the exploring uses at least one communications path of the one or more communications paths to explore the one or more network elements; and
   identifying, in response to a failure encountered during the exploring, a faulty network component in a communications path, wherein said identifying comprises systematically retrying one or more network elements of the network in the communications path to identify the faulty network component, the systematically retrying comprising checking in a predefined order responsiveness of each network element of one or more network elements in the communications path, wherein the predefined order directs backing up through the network elements in the communications path from an unresponsive network element targeted for exploration.

2. A method of exploring a network, said method comprising:
   sending a message to a child network element to explore the child network element;
   sending a message to a parent network element of the child network element, when the child network element is considered unresponsive;
   determining that a link between the parent network element and the child network element is faulty, when the parent network element is responsive and the child network element is considered unresponsive;
   selecting a parent of the parent network element and sending a message to the parent, when the parent network element is considered unresponsive;
   repeating the selecting one or more times, when the selected parent is considered unresponsive, wherein with each iteration the selected parent becomes the parent network element and the newly selected parent is the parent of the parent network element; and
   indicating that a link between the parent network element and its parent is faulty, when the parent is responsive and its parent network element is considered unresponsive.

3. A system of exploring a network, said system comprising:
   means for exploring one or more network elements of a network, said network comprising one or more communications paths, and wherein the means for exploring uses at least one communications path of the one or more communications paths to explore the one or more network elements; and
   means for identifying, in response to a failure encountered during the exploring, a faulty network component in a communications path, wherein said means for identifying comprises means for systematically retrying one or more network elements of the network in the communications path to identify the faulty network component, the means for systematically retrying comprising means for checking in a predefined order responsiveness of each network element of one or more network elements in the communications path, wherein the predefined order directs backing up through the network elements in the communications path from an unresponsive network element targeted for exploration.

4. A system of exploring a network, said system comprising:
   means for sending a message to a child network element to explore the child network element;
   means for sending a message to a parent network element of the child network element, when the child network element is considered unresponsive;
   means for determining that a link between the parent network element and the child network element is faulty, when the parent network element is responsive and the child network element is considered unresponsive;
   means for selecting a parent of the parent network element and sending a message to the parent, when the parent network element is considered unresponsive;
   means for repeating the selecting one or more times, when the selected parent is considered unresponsive, wherein with each iteration the selected parent becomes the parent network element and the newly selected parent is the parent of the parent network element; and
   means for indicating that a link between the parent network element and its parent is faulty, when the parent is responsive and its parent network element is considered unresponsive.

5. A system of exploring a network, said system comprising:
   one or more network elements of a network to be explored, said network comprising one or more communications paths, and wherein the exploring of the one or more network elements uses at least one communications path of the one or more communications paths to explore the one or more network elements; and
   an explorer node coupled to the one or more network elements to identify, in response to a failure encountered during the exploring, a faulty network component in a communications path, said explorer node to identify by systematically retrying one or more network elements of the network in the communications path to identify the faulty network component, the systematically retrying comprising checking in a predefined order responsiveness of each network element of one or more network elements in the communications path, wherein the predefined order directs backing up through the network elements in the communications path from an unresponsive network element targeted for exploration.

6. A system of exploring a network, said system comprising:

at least one explorer node to perform the following:

sending a message to a child network element to explore the child network element;

sending a message to a parent network element of the child network element, when the child network element is considered unresponsive;

determining that a link between the parent network element and the child network element is faulty, when the parent network element is responsive and the child network element is considered unresponsive;

selecting a parent of the parent network element and sending a message to the parent, when the parent network element is considered unresponsive;

repeating the selecting one or more times, when the selected parent is considered unresponsive, wherein with each iteration the selected parent becomes the parent network element and the newly selected parent is the parent of the parent network element; and indicating that a link between the parent network element and its parent is faulty, when the parent is responsive and its parent network element is considered unresponsive.

7. At least one computer program storage device readable by computer, tangibly embodying at least one program of instructions executable by the computer to perform a method of exploring a network, said method comprising:

exploring one or more network elements of a network, said network comprising one or more communications paths, and wherein the exploring uses at least one communications path of the one or more communications paths to explore the one or more network elements; and identifying, in response to a failure encountered during the exploring, a faulty network component in a communications path, wherein said identifying comprises systematically retrying one or more network elements of the network in the communications path to identify the faulty network component, the systematically retrying comprising checking in a predefined order responsiveness of each network element of one or more network elements in the communications path, wherein the predefined order directs backing up through the network elements in the communications path from an unresponsive network element targeted for exploration.

8. At least one program storage device readable by a computer, tangibly embodying at least one program of instructions executable by the computer to perform a method of exploring a network, said method comprising:

sending a message to a child network element to explore the child network element;

sending a message to a parent network element of the child network element, when the child network element is considered unresponsive;

determining that a link between the parent network element and the child network element is faulty, when the parent network element is responsive and the child network element is considered unresponsive;

selecting a parent of the parent network element and sending a message to the parent, when the parent network element is considered unresponsive;

repeating the selecting one or more times, when the selected parent is considered unresponsive, wherein with each iteration the selected parent becomes the parent network element and the newly selected parent is the parent of the parent network element; and indicating that a link between the parent network element and its parent is faulty, when the parent is responsive and its parent network element is considered unresponsive.

* * * * *